(12) United States Patent
Stava

(10) Patent No.: US 9,744,725 B2
(45) Date of Patent: Aug. 29, 2017

(54) PRESERVING THIN COMPONENTS FOR 3D PRINTING

(71) Applicant: Adobe Systems Incorporated, San Jose, CA (US)

(72) Inventor: Ondrej Stava, Cupertino, CA (US)

(73) Assignee: Adobe Systems Incorporated, San Jose, CA (US)

( * ) Notice: Subject to any disclaimer, the term of this patent is extended or adjusted under 35 U.S.C. 154(b) by 674 days.

(21) Appl. No.: 14/018,618

(22) Filed: Sep. 5, 2013

(65) Prior Publication Data

US 2015/0066179 A1    Mar. 5, 2015

(51) Int. Cl.
*G06F 19/00* (2011.01)
*B29C 67/00* (2017.01)
*B33Y 50/00* (2015.01)

(52) U.S. Cl.
CPC ...... *B29C 67/0088* (2013.01); *B29C 67/0092* (2013.01); *B33Y 50/00* (2014.12)

(58) Field of Classification Search
CPC .. B29C 67/0088; B29C 67/0092; B33Y 50/00
USPC ..................................................... 700/97–98
See application file for complete search history.

(56) References Cited

U.S. PATENT DOCUMENTS

| | | | | |
|---|---|---|---|---|
| 6,201,988 B1 * | 3/2001 | Bourland | ............. | A61N 5/1031 378/65 |
| 2004/0075196 A1 * | 4/2004 | Leyden | ................... | B29C 41/12 264/401 |
| 2008/0273777 A1 * | 11/2008 | Luboz | ................... | G06T 7/0081 382/130 |
| 2010/0066760 A1 * | 3/2010 | Mitra | ...................... | G06T 19/20 345/629 |
| 2012/0010741 A1 * | 1/2012 | Hull | .................... | B29C 67/0092 700/98 |
| 2012/0209394 A1 * | 8/2012 | Bojarski | ............. | A61F 2/30942 623/20.32 |
| 2013/0211531 A1 * | 8/2013 | Steines | ................. | A61F 2/4684 623/20.35 |

(Continued)

OTHER PUBLICATIONS

Shape Simplification Based on the Medial Axis Transform by Tam et al. dated Oct. 19-24, 2003.*

(Continued)

*Primary Examiner* — Ziaul Karim
(74) *Attorney, Agent, or Firm* — Kilpatrick Townsend & Stockton LLP

(57) ABSTRACT

Methods and systems are disclosed for preserving thin components for three dimensional (3D) printing. An exemplary method generates a medial axis of a 3D shape and identifies components of the 3D shape that need to be preserved by applying a transform to the medial axis. The method creates an output model based at least in part on the components and an insetted shape corresponding to the 3D shape. A system includes a computing device with a processor and a memory having instructions that, if executed, cause the processor to perform operations. The operations comprise generating a medial axis of a 3D shape and applying a transform to the medial axis to identify one or more components of the shape to be preserved. The operations further comprise creating an output model based at least in part on the one or more components and an insetted shape corresponding to the 3D shape.

16 Claims, 13 Drawing Sheets

(56) References Cited

U.S. PATENT DOCUMENTS

| | | | | |
|---|---|---|---|---|
| 2014/0067106 A1* | 3/2014 | Makeig | ................... | G06F 17/50 700/98 |
| 2014/0228860 A1* | 8/2014 | Steines | ............... | A61F 2/30942 606/130 |
| 2015/0066178 A1* | 3/2015 | Stava | .................. | B29C 67/0088 700/98 |

OTHER PUBLICATIONS

Liu et al., Extended Grassfire Transform on Medial Axes of 2D Shapes, Computer-Aided Design, Solid and Physical Modeling, vol. 43, Issue 11, Nov. 2011, pp. 1496-1505.

* cited by examiner

PRESERVING THIN COMPONENTS FOR 3D PRINTING

TECHNICAL FIELD

This disclosure relates generally to computer-implemented methods and systems for three-dimensional (3D) printing and more particularly relates to systems and methods for 3D printing of objects having thin elements and components.

BACKGROUND

Three-dimensional (3D) printing is a type of additive manufacturing where the shape of a printed object is modeled incrementally, layer by layer, to make a solid 3D object from a digital model by laying down successive layers of material in different shapes. Some 3D printers are capable of successfully printing features that are less than 15 microns wide. However, many 3D printers are still heavily constrained by their supported resolution. This includes 3D printers using certain printing materials, such as metals. For these printers, the effective minimal printable feature size is often in the range of 0.1 to 1 millimeters, which leads to problems because many thinner features in 3D objects cannot be printed correctly using such 3D printers.

One approach employed by current 3D printer software to handle thin features is to deposit material uniformly across the volume of a 3D model corresponding to an object to be printed. An example of this is shown in FIG. 1 with printed material 106 being deposited over an input object 102. One problem with this approach is shown in the outline of the printed object 114 in FIG. 1. Because the minimal size of the deposited printed material 106 is equal to the minimal feature size 104, f_min, the printing process effectively offsets the outline of the object 114 by f_min/2 (see dashed outline in FIG. 1), and the material deposited 106 on the outline spreads to the exterior. While the thin components 108 of the input model 102 can be represented in the printed object 114, they are often too thick because the effective resolution is lowered to as low as one-half of the maximum possible resolution (see, e.g., the altered thin components 118). Another drawback of this approach is that the implicit offsetting of the surface degrades any fine detail, such as the surface details 110 shown in FIG. 1, that are present on the object surface (see, e.g., the altered surface details 112 in FIG. 1).

Another approach is to preserve the exact size of the object, which can be achieved by insetting the outline of the printed shape inwards by half of the minimal feature size (see insetted version of model 212 in FIG. 2). This compensates for the minimal size of deposited material as described above so that the effective size of the printed object 214 is approximately the same as the shape of the model 102. However, a disadvantage of this approach is that the insetting eliminates all components thinner than f_min as shown in the printed object 214 with eliminated thin components 218 in FIG. 2.

SUMMARY

In one embodiment, a method includes generating, by a computing device, a medial axis of a three dimensional (3D) shape. The method then applies, by the computing device, a mathematical transform to the medial axis in order to identify one or more components of the 3D shape that need to be preserved. Next, the method creates an output model based at least in part on the one or more components and an insetted shape corresponding to the 3D shape.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
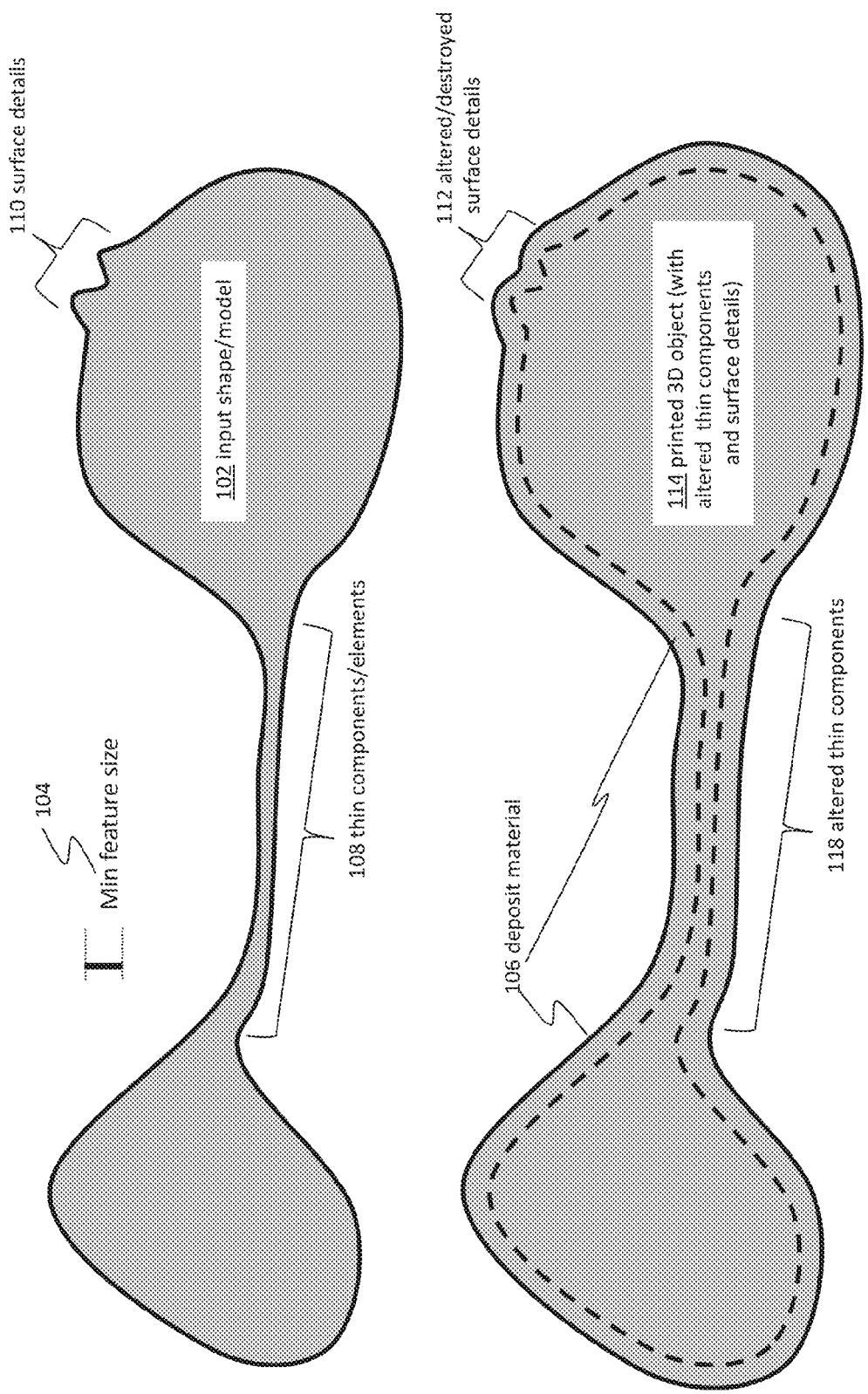
FIGS. 1 and 2 illustrate traditional approaches that attempt to deal with printing of thin elements by depositing a printing material uniformly around an object to be printed and insetting a shape.

Methods and systems are disclosed for preserving both the size of a 3D model and its thin components. The methods and systems preserve thin components and surface features that would otherwise be eliminated using the approaches described above with reference to FIGS. 1 and 2. Embodiments provide a feature-preserving insetting method using a medial axis based analysis of a 3D model to automatically detect thin components and to convert them into curves or surfaces that are printed with the minimal possible feature size. In this way, the printed model (i.e., the 3D object) has substantially the same thin components and surface features as its corresponding 3D model.

Exemplary embodiments detect when a surface feature or component of a 3D shape is too thin to be readily printed in correct size. Embodiments identify, for a given 3D model, features or components that will disappear and/or be altered in a printed 3D object corresponding to the 3D model. Embodiments detect any such components and features and replace them with a new 3D volume that guarantees that they are printed at least with minimum size attributes appropriate for a selected output device, such as a 3D printer.

An exemplary method allows printing of thin components while maintaining the correct size of the printed model (i.e., the 3D object). The method enables accurate printing of 3D models with fine, thin surface details for use-cases where high precision is desired (e.g., printing of mechanical parts). The method enables 3D printers using printing materials such as plastics and having filaments that can deposit materials in widths of less than 0.6 millimeters to be used to produce mechanical parts with thin features, such as certain gear system parts, or any other mechanical parts that needs to fit together in an interlocking system.

According to an embodiment, one or more algorithms are applied to a three dimensional (3D) shape to identify thin or other components to be preserved, and those identified components are used to create an output model for printing at a given output device. The output model is created so that, when printed at the given output device, the identified components are preserved and are of sufficient size and shape that they are not undesirably altered due to printing tolerances and errors. The one or more algorithms applied to identify the components to be preserved can do so using a medial axis of the 3D shape. A computed medial axis can, for example, be used with branches from the medial axis to a boundary of the 3D shape to identify the components to be preserved. For example, the union of medial axis and an insetted version of the 3D shape can be used to identify the thin or other components to be preserved. The medial axis used in such computations can be generated in various ways and/or refined using additional algorithms. In one embodiment, the medial axis has multiple branches and an algorithm is used to determine which branches are relevant (i.e., significant) to thin or other components to be preserved.

Other embodiments involve computer implemented methods and/or computer readable storage media having executable instructions stored thereon that if executed by a processor of a computing device, cause the processor to perform operations. The instructions include instructions for generating a medial axis of a three dimensional (3D) model. The instructions also include instructions for applying a mathematical transform to the medial axis to identify one or more components of the 3D model that need to be preserved. The instructions further comprise instructions for creating an output model based on the one or more components and an insetted shape corresponding to the 3D model.

In another embodiment, a system includes a computing device with a processor and a memory having instructions stored thereon that, if executed by the processor, cause the processor to perform operations. The operations comprise generating a medial axis of a 3D shape and applying a transform to the medial axis to identify one or more components of the shape to be preserved. The operations further comprise creating an output model based at least in part on the one or more components and an insetted shape corresponding to the 3D shape.

In yet another embodiment, a system creates an output model as a union of an insetted shape corresponding to an input 3D shape and one or more components to be preserved so that the output model includes the insetted shape and the one or more components.

Exemplary methods, computer readable media, and systems are provided for preserving thin elements of printed 3D objects, including elements having widths less than or equal to a printer-specific threshold value. For example, in cases where a given 3D printer supports a minimal feature size of 15 microns, the methods, computer readable media and systems can preserve thin elements having widths of 15 microns or less. Exemplary methods and systems generate a medial axis for a 3D model and then apply an extended grassfire transform to identify respective portions or parts of the medial axis corresponding to thin components and surface features of the 3D model that need to be preserved. The methods and systems can assign a burn time to each vertex of the medial axis of the 3D model, where the burn time indicates the shortest distance to the end of the longest disk in the 3D model that can be embedded on the 3D model's medial axis at a given point. The methods and systems can then identify parts of the medial axis of the 3D model where the burn time is larger than a predefined threshold value as parts or portions of a medial axis corresponding to thin components and features that need to be preserved.

Figure 2:
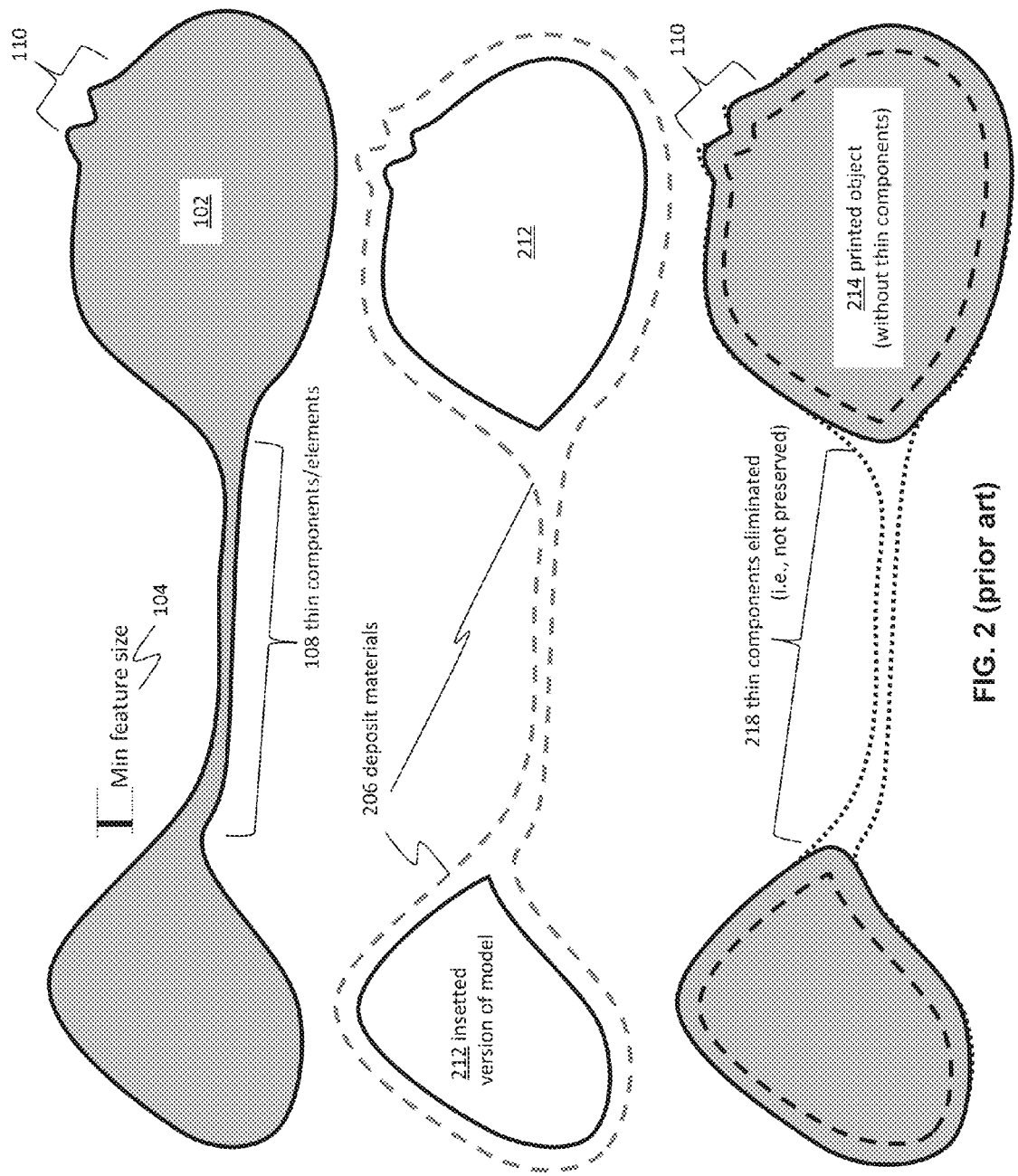

In certain embodiments, a minimal feature size is determined and an outline of a 3D shape is insetted inwards from a boundary of the 3D shape by half of the determined minimal feature size. The minimal feature size can be based on a minimal possible feature size (e.g., minimal thickness) supported by an output device (e.g., a 3D printer) and a printing material selected to print a 3D object corresponding to the 3D shape. An exemplary minimal feature size 104 is shown in FIGS. 1 and 2. The insetting creates an insetted version of the 3D shape to be printed. According to these embodiments, a medial axis of the 3D shape is generated and a transform is applied to the medial axis in order to identify components of the 3D shape that need to be preserved. These embodiments then create an output model as a union of the insetted shape and the components that need to be preserved.

The terms "thin components," "thin features," and "thin elements" are used interchangeably herein to refer to portions, parts, or sub-areas of a 3D model, shape or object that are relatively thinner that other portions of the 3D model, shape or object. In embodiments, thin features can be relatively fine surface details (see, e.g., surface details 110 of FIG. 1) of a 3D shape having widths approaching a minimal feature size of an output device selected to print a 3D object corresponding to the 3D shape. For example, thin components can have widths substantially the same as or less than a minimal feature size supported by a given 3D printer, such as the minimal feature size 104 shown in FIGS. 1 and 2. Thin features can include protrusions from a surface of a 3D shape, such as, but not limited to, tabs, appendages, posts, shafts, pistons, loops, cylinders, hooks, limbs, teeth, gears, and other parts projecting or extending outward from a boundary of a 3D shape (see, e.g., thin components 508 in FIG. 5). Also, for example, thin components can include indentations, apertures, chambers, gaps, openings, lumens, holes, and other features extending inward from a surface of a 3D shape. Thin elements can also include, for example, struts, members, and elements connecting two or more relatively thicker portions of a 3D shape, model, or object (see, e.g., thin components 108 in FIG. 1). Embodiments identify thin components of a 3D model that need to be preserved. Such components are interchangeably referred to herein as "components to be preserved," "preserved components," and "preserved thin components." In certain embodiments, thin components, features, and elements have widths less than or equal to a printer-specific threshold, such as, for example, a minimal feature size of a given 3D printer. For example, if a selected 3D printer supports a minimal feature size of 15 microns, exemplary techniques described herein can preserve thin components as thin as, or thinner than 15 microns.

As used herein, the term "medial axis" refers to a set of connected interior points near a center point within a portion of a 3D shape or 3D model. A medial axis can be a set of curves and surfaces and can be obtained by computing a set of connected points describing the topology of a 3D model, the points being connected by edges and faces of the 3D model. A medial axis can be comprised of center points of tubes or elongate disks within a 3D shape. A medial axis can be generated (i.e., graphed, plotted, or modeled) in order to capture protrusions and topology of a 2D shape representing a layer, cross-section, or projection of a 3D shape. For a 2D shape, a medial axis can comprise a plurality of interior points within the 2D shape with at least two closest points on an exterior boundary of the 2D shape. A medial axis can represent part the topology structure of a 3D shape that is located in the middle of a 3D model of the 3D shape. A portion or part of a medial axis can be conceptualized as a local centroid of a given region of a 3D model. In embodiments, a medial axis is generated for a 3D shape or 3D model wherein each point of the medial axis has a thickness associated with it and is in a middle or center of a radius or area. The area around each point on a medial axis can be indicated by the thickness associated with a given, i.e., a center of a sphere with a given radius. A 3D object corresponding to a 3D model can be constructed based on a medial axis and thickness values associated with points along the medial axis.

As used herein, the term "insetting" refers to including a smaller shape (i.e., an insetted shape) within an outline or boundary of a shape. An insetted shape can be a smaller version of a shape, where the insetted shape fits within boundaries of the shape. Insetting can be performed based on a fixed or calculated offsets. A given offset for an inset shape can be a fixed, uniform amount, or a calculated value. For example, an offset for an insetted shape can be half of a minimum feature or component size for a two dimensional (2D) or 3D shape. In this example, an insetted shape for such a 2D or 3D shape will be an outline of the shape that is an inwards offset from the outer boundary of the shape, wherein the offset is half of the minimal feature size of the shape.

As used herein, the term "output device" refers to any device capable of producing a 3D object corresponding to a 3D model. An output device can be, for example, a 3D printer. As used herein, the terms "output material" and "printing material" can refer to any material usable by an output device to produce a 3D object. Non-limiting examples of printing materials include plastics such as acrylonitrile butadiene styrene (ABS) and metals.

Unless specifically stated differently, a "user" is interchangeably used herein to identify a user account, a human user, or a software agent. Besides a human user who wishes to create 3D objects corresponding to a 3D model having thin components, a software application or agent sometimes needs to create such 3D objects. Accordingly, unless specifically stated, the term "user" as used herein does not necessarily pertain to a human being.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

These illustrative examples are given to introduce the reader to the general subject matter discussed here and are not intended to limit the scope of the disclosed concepts. The following sections describe various additional embodiments and examples with reference to the accompanying. In the drawings, generally, common or like reference numbers indicate identical or functionally similar elements. Additionally, generally, the left-most digit(s) of a reference number identifies either the drawing in which the reference number first appears or the drawing in which a related element first appears. The following sections describe various additional embodiments and examples with reference to the drawings in which like numerals indicate like elements. For brevity, only the differences occurring within the Figures, as compared to previous or subsequent ones of the figures, are described below.

Exemplary Method for Preserving Thin Components

Figure 3:
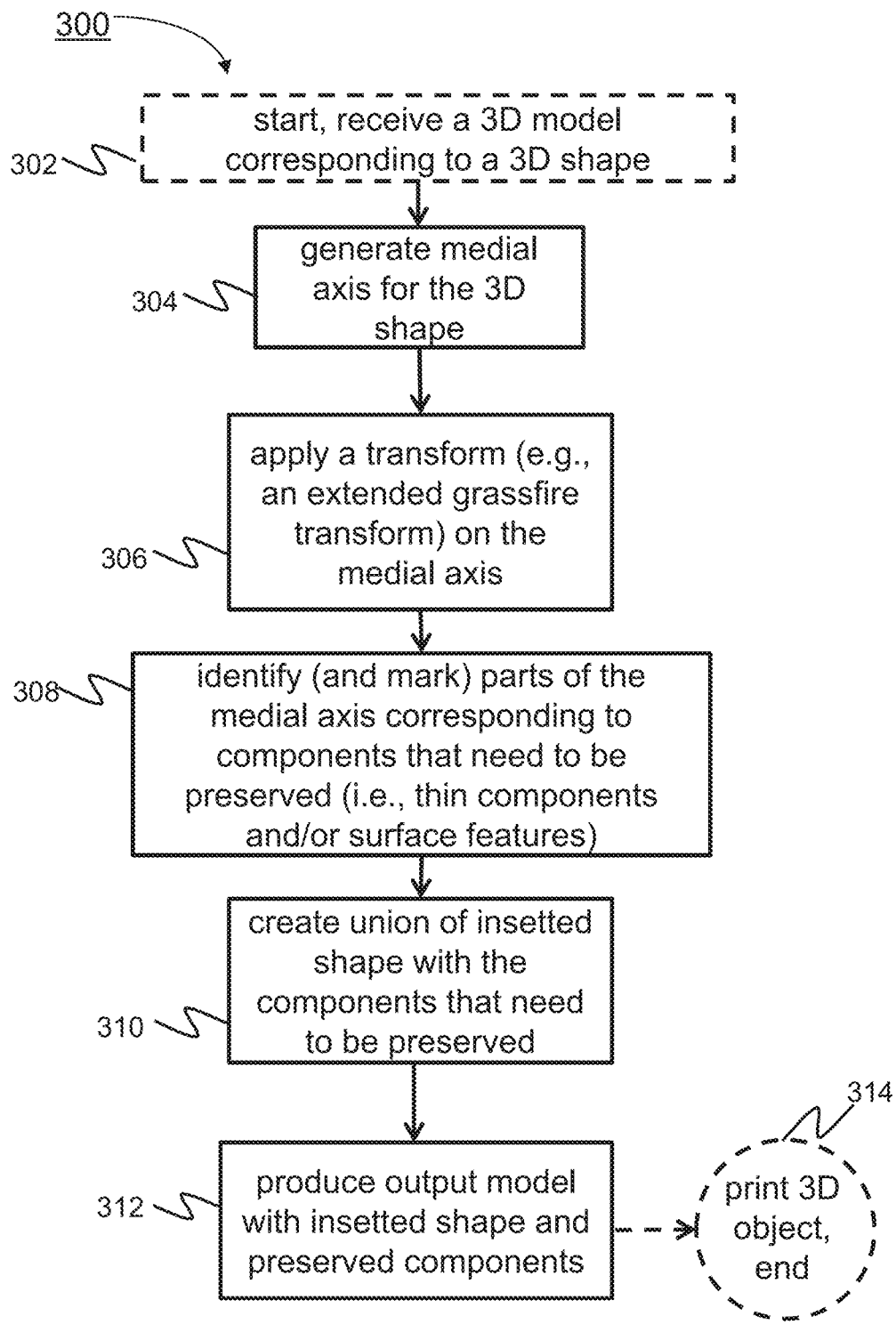
FIG. 3 is a flow chart illustrating an exemplary method for identifying, preserving and printing elements of 3D shapes, in accordance with embodiments.

FIG. 3 is a flow chart illustrating an example method for identifying and preserving elements of a shape. In particular, FIG. 3 illustrates an example method 300 for identifying and preserving elements of a 3D shape that need to be preserved. As shown, the method 300 starts at step 302 when a 3D model is input. Optional portions of steps are indicated in the flowchart by dashed lines and parenthetical phrases (see, e.g., steps 302, 306, 308 and 314).

In optional step 302, a 3D model is received. As shown the received 3D model corresponds to a 3D shape. In an embodiment, the 3D model can be received as input to the method 300. After the 3D model is received, control is passed to step 304.

Next, in step 304, the method 300 generates the medial axis of the 3D shape. Step 304 can comprise generating a medial axis for a 3D shape corresponding to the 3D model received in step 302. The medial axis generated in step 304 describes the topology of the 3D shape as a set of lines and surfaces with associated thicknesses. In an embodiment, the medial axis generated in step 304 is substantially located in the center of the 3D shape (or one or more sub-shapes of the 3D shape). This may make the medial axis suitable for identifying components of the 3D shape that need to be preserved (see, e.g., thin components 408 of model 402 in FIG. 4C). In its raw form, the medial axis generated in step 304 can be very noisy and have many branches going toward the shape's boundary preserved (see, e.g., medial axis 414 and its branches 416 in FIG. 4C). After the medial axis is generated, control is passed to step 306.

Next, in step 306, a mathematical transform is applied to the medial axis generated in step 304. As shown, in one non-limiting embodiment, the transform applied in step 306 is an extended grassfire transform. Parts of the medial axis that correspond to thin components to be preserved can be defined based on where different fire fronts meet and quench (see, e.g., fire fronts 618 and vertex 624 of medial axis 614 in FIG. 6A). Step 306 involves applying a transform, such as, for example, an extended grassfire transform, to the medial axis of a 3D shape so that thin components can then be identified by parts of the medial axis. Non-limiting examples of applying an extended grassfire transform to 2D shapes are described in Liu et al., Extended Grassfire Transform on Medial Axes of 2D Shapes, Computer-Aided Design, Solid and Physical Modeling, Volume 43, Issue 11, November 2011, pp. 1496-1505. Step 306 can be performed by determining which of the branches of a medial axis should be preserved. For example, step 306 can comprise applying a transform to determine which of the branches 416 of the medial axis 414 shown in FIG. 4E should be preserved.

Step 306 can comprise computing and assigning a significance measure to vertices of the medial axis generated in step 304. A medial axis of a 3D model or shape can contain portions or branches that do not represent meaningful features, such as, for example, small boundary perturbations that do not need to be preserved. In order to determine significance of such portions and branches, embodiments compute a significance measure for portions and branches of a medial axis. An exemplary significance measure can be computed by applying a mathematical transform, such as, for example, an extended grassfire burning transform, on the medial axis (see, e.g., the medial axis 414 in FIG. 4D). In embodiments of method 300 using an extended grassfire burning transform, step 308 can assign each vertex of a medial axis a 'burn time' $b_v$ that, intuitively describes the shortest distance to the end of the longest tube (or a disk in a 3D shape) that can be embedded on the medial axis at a given point. According to an embodiment, step 306 includes identifying those parts of the medial axis where the burn time is larger than a predefined threshold value $b_{min}$. In an embodiment, step 306 identifies parts of the medial axis where $b_v > b_{min}$. For example, these parts of the medial axis of a 3D shape with $b_v > b_{min}$ can be identified as parts of the medial axis corresponding to components that need to be preserved.

In embodiments where step 306 includes applying an extended grassfire transform, the medial axis and its branches generated in step 304 can be conceptualized as thin threads of grass of the same material, wherein each end of the medial axis and its branches (see, e.g., medial axis 414 and its branches 416 in FIG. 4D) are ignited at the same. This fire can propagate or spread from those ends along the medial axis at a uniform speed. This propagation can be conceptualized in terms of multiple fire fronts spreading in respective burn directions from respective ends of a medial axis or branches of a medial axis (see, e.g., fire fronts 618 and burn directions 622 in FIG. 6A). In cases where a fire front comes to a junction, such as a vertex of two portions of the medial axis or a junction between the medial axis and one of its branches, the fire front continues onwards if there is one remaining un-burned branch. Otherwise, in cases where there are no more un-burned branches remaining where two or more fire fronts meet, those fire fronts are annihilated (i.e., extinguished) and cease to spread. In cases where multiple fire fronts meet at the same location and there are no remaining un-burned branches at that location, these multiple fire fronts quench each other (i.e., the fire fronts put each other out) and cease propagating. An exemplary illustration of applying a transform by using fire fronts with exemplary annihilation and quenching behavior is described below with reference to FIGS. 6A and 6B. In an embodiment, step 306 ends when no fire front is active. After applying the transform, control is passed to step 308.

Next, step 308 is performed to identify (i.e., compute) which parts of the medial axis belong to one or more components that need to be preserved. In the example embodiment of FIG. 3, this step can include marking the identified parts of the medial axis of the components that need to be preserved. As shown, such components can include thin components and/or surface features of the 3D shape. According to an embodiment, components that need to be preserved (i.e., preserved components) are identified in step 308 based on the parts of the medial axis identified in step 306 as having a burn time larger than the predefined threshold value $b_{min}$. In an embodiment, based on the transform applied in step 306, step 308 marks parts of the medial axis where $b_v > b_{min}$ as parts of the medial axis corresponding to preserved components. For example, the marked parts of the medial axis of a 3D shape with $b_v > b_{min}$ can be stored in the 3D model corresponding to the 3D shape. In an embodiment, steps 306 and 308 can be combined. For example, a transform can be applied to the medial axis in order to identify (i.e., compute) parts of the medial axis that correspond to components that need to be preserved. After the parts of the medial axis corresponding to components that need to be preserved are identified, control is passed to step 310.

Next, in step 310, a union of an insetted shape corresponding to the 3D shape with the identified medial axis components is produced. This step can be accomplished by uniting the insetted shape with the marked parts of the medial axis for the components that need to be preserved (see, e.g., the union of insetted shape 412 and thin components 408 in FIG. 4B). After the union of the insetted shape and the components to be preserved has been created, control is passed to step 312. In embodiments, the insetted shape for the 3D shape is based on one or more of a selected size or scale of a corresponding 3D object to be printed, properties of a selected output device, such as a 3D printer, and printer material properties for a selected output material, such as a plastic or metal. According to embodiments, insetting can be based in part on properties of a 3D printer and selected printer material properties. That is, the insetting can be performed as part of step 310 by calculating an offset amount for the insetted shape, with the offset amount being based in part on a minimal thickness that a selected 3D printer can produce.

At this point, step 312 is performed to produce an output model with the insetted shape and the preserved components. The output model produced in step 312 can be subsequently used by an output device (i.e., a 3D printer). In certain embodiments, steps 310 and 312 can be combined in a single operation whereby the output model is created as a union of the insetted shape and the preserved components. In additional or alternative embodiments, the output model produced in step 312 is based at least in part on the insetted shape and the preserved components. The result of completing steps 304-312 is a shape that can be used as the target for material deposition for a given 3D printer (see, e.g., target 422 in FIG. 4E). This embodiment ensures that a printed 3D object will have the same size as a corresponding computer model of a 3D shape, such as the 3D model received in step 302, and that the thin components will be printed with the minimal allowed thickness supported by a given printer. At this point, control is optionally passed to step 314.

In optional step 314, a 3D object corresponding to the output model produced in step 312 is printed and then the method 300 ends. Step 314 can include forwarding the output model produced in step 312 to a selected output device, such as, for example, a 3D printer, and then printing a 3D object corresponding to the output model using the output device. The printed 3D object will include the preserved components identified as a result of completing steps 306 and 308.

Exemplary Thin Component Preservation for a 3D Shape

Figure 4A:
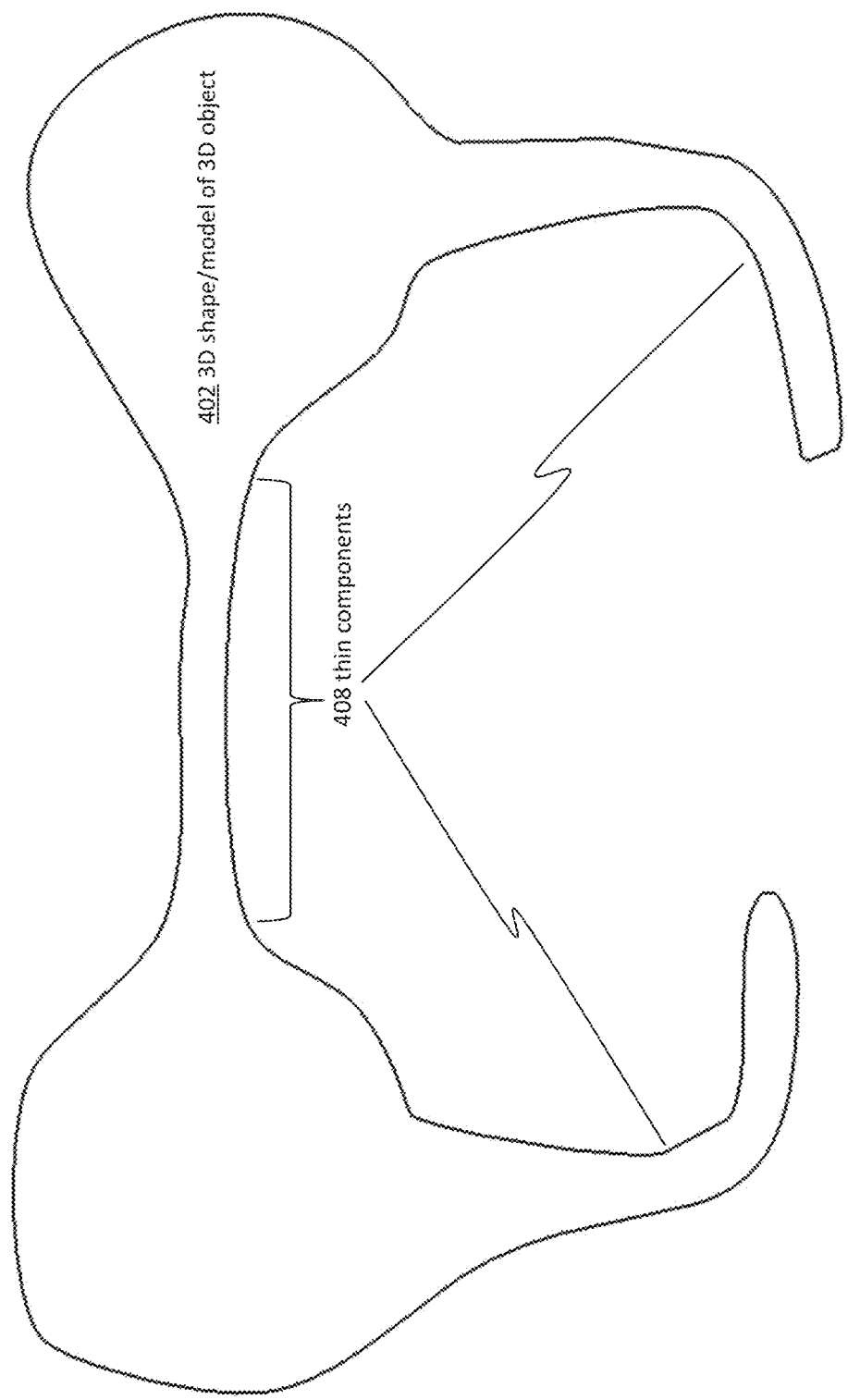
FIGS. 4A-4E illustrate techniques for identifying and preserving elements in a 3D shape, in accordance with embodiments.
Figure 4B:
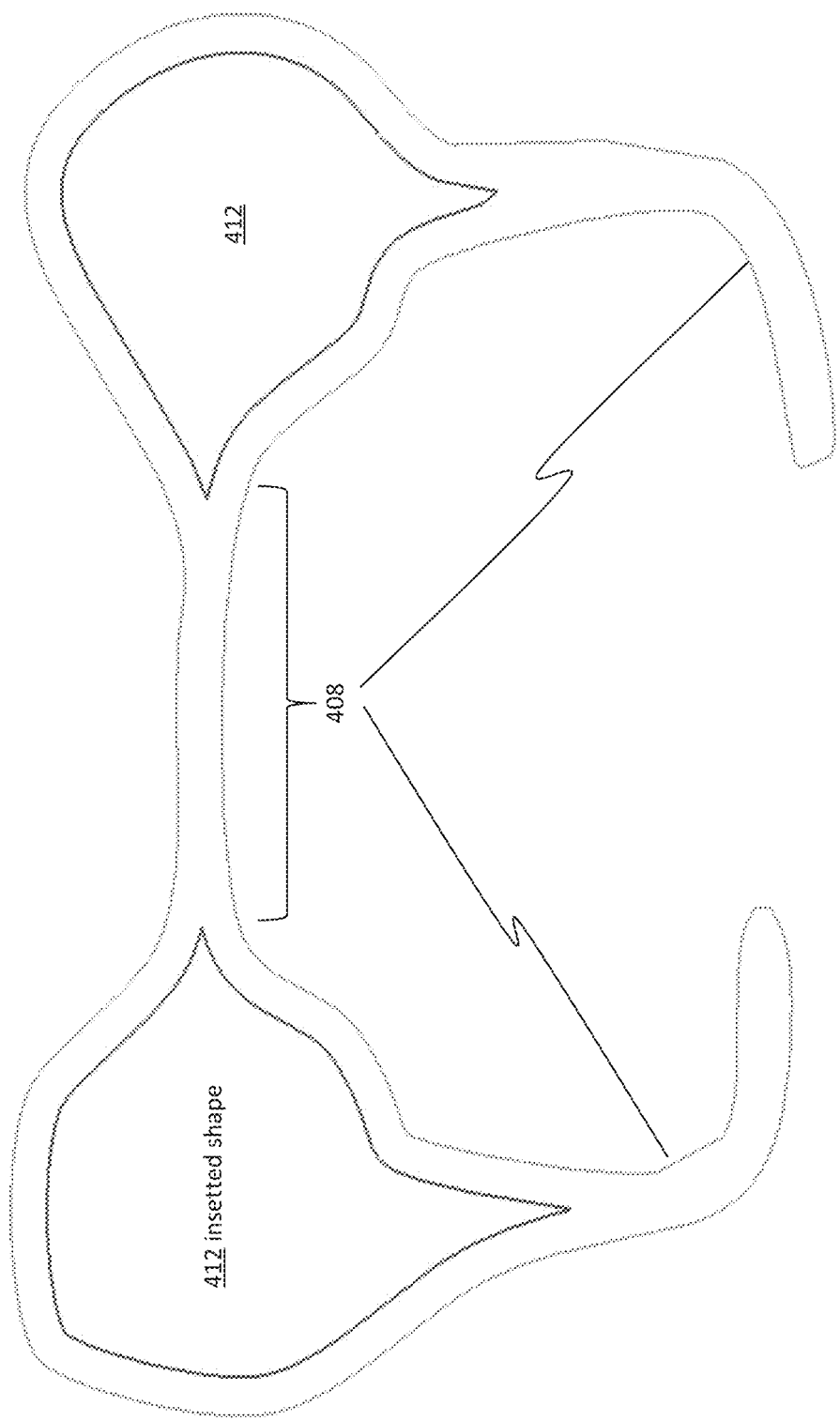

FIGS. 4A-4E illustrate exemplary steps for identifying and preserving thin components for a given 3D model. In particular, FIGS. 4A-4E show the output of steps of exemplary thin component preservation for a 3D model (i.e., the model 402 in FIG. 4A). FIG. 4B shows that when the model 402 is insetted to produce an insetted shape 412, the thin components 408 of the shape corresponding to the model 402 disappear. In one embodiment, the model 402 can be represented as a 2D shape.

Figure 4C:
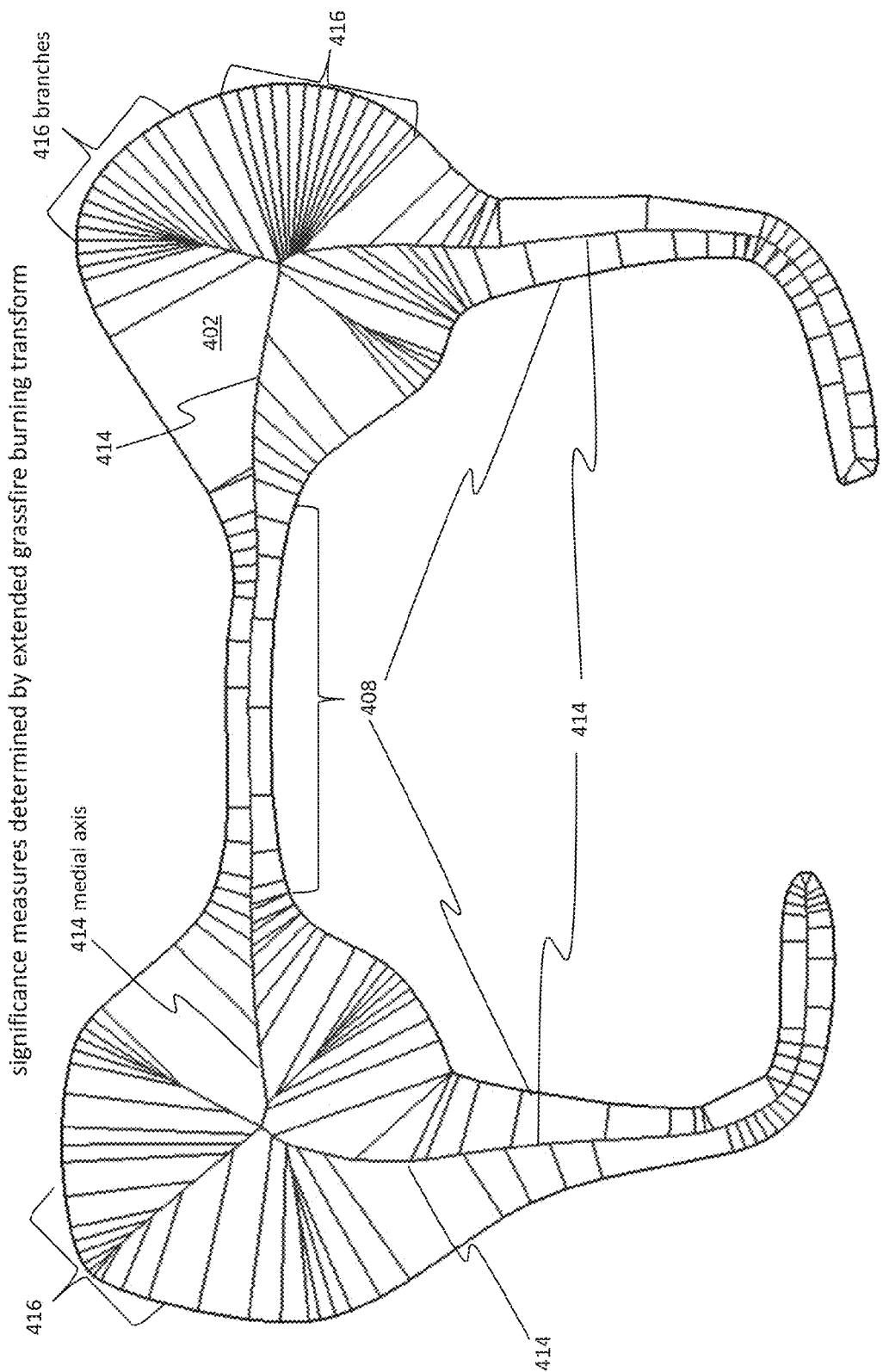

As shown in FIG. 4C, an embodiment finds thin features and components 408 based on the medial axis 414 of the model 402. As described above with reference to steps 306 and 308 of the method 300, to identify the thin components 408 that should be preserved, an embodiment computes a significance measure of components of a shape using an extended grassfire burning transform. Significance measures for features and components of the model 402, including the thin components 408, can be computed and marked by applying an extended grassfire burning transform to the branches 416 of the medial axis 414. In one embodiment, a significance measure can be computed for every branch 416 of the medial axis 414. As seen in FIG. 4C, the branching structure with the branches 416 from the medial axis 414 can be very dense or noisy because it includes all of the branches 416 to the surface of the model 402. For the purposes of preserving thin components 408, embodiments may not need all of the branches 416. Certain embodiments can implement an algorithm to indicate which branches 416 are relevant to the thin components 408 and which branches 416 describe other portions of the model 402. The algorithm can identify portions of the medial axis 414 whose significance measure exceeds a given threshold, wherein the identified portions are deemed to describe the thin components 408. An embodiment applies an extended grassfire burning transform to determine significance measures for every point on the medial axis 414. By using these measures, the embodiment can extract the branches 416 that are entirely or partially above a given threshold. As described below with reference to FIG. 4E, the extracted branches 416 for the thin components 408 can be used to combine the thin components 408 with the insetted shape 412.

Figure 4D:
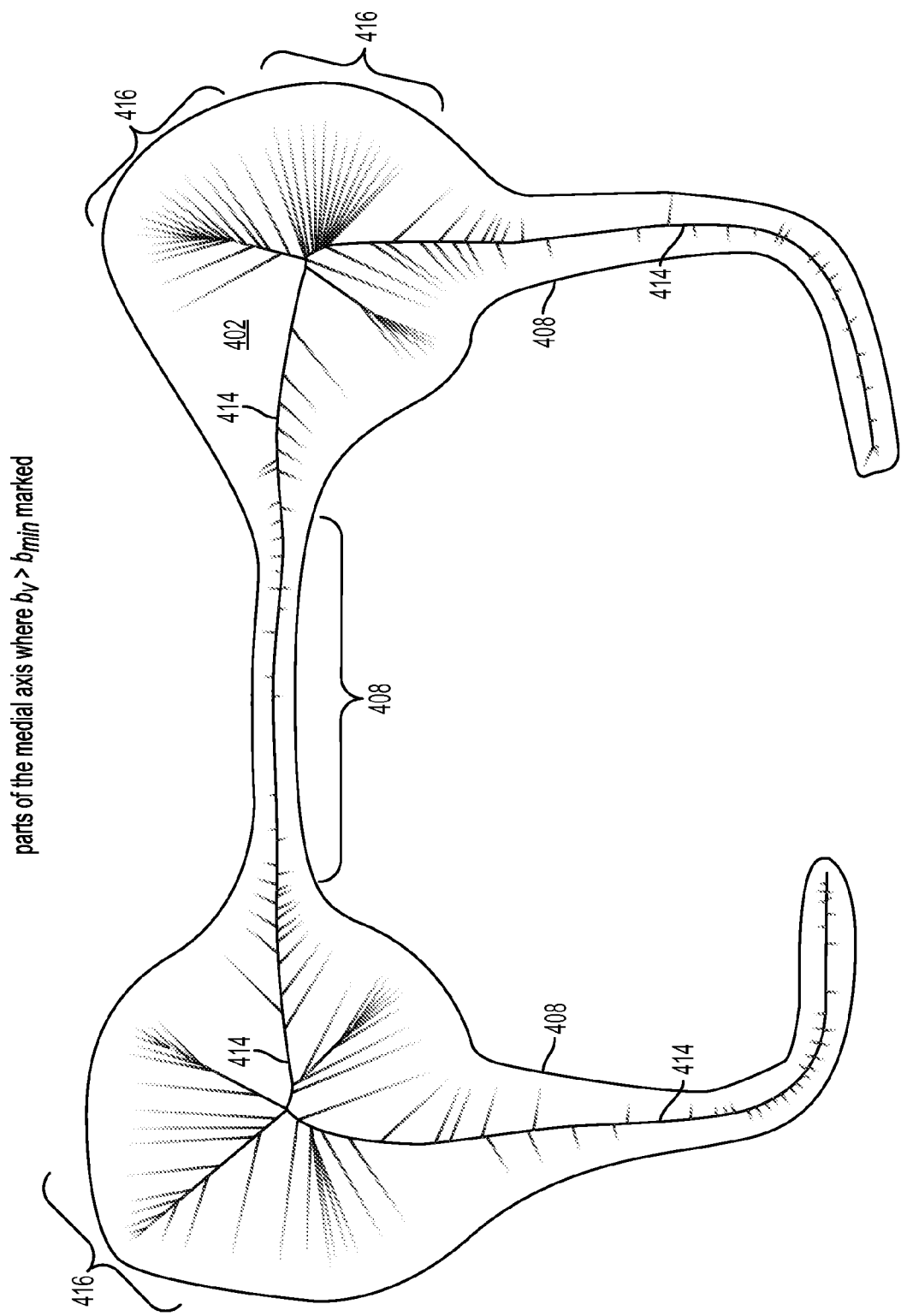

An exemplary result of applying an extended grassfire burning transform on the medial axis 414 and its branches 416 is depicted in FIG. 4D, which shows the calculated and marked parts of the medial axis 414 corresponding to the thin components 408. In particular, FIG. 4D shows the results of applying an extended grassfire transform on the ends of the medial axis 414 and the branches 416 shown in FIG. 4C. In embodiments, the medial axis 414 is essentially generated as a descriptor of the model 402 as a lower dimensional descriptor. For example, in the case of a 3D model 402, the medial axis 414 can be generated as a 2D shape located within the 3D model 402. As shown, the medial axis 414 is inside of the model 402 and it can describe local components, including thin components 408, of the model 402. That is, the medial axis 414 can be generated such that it describes topology and the components of the model 402. In certain embodiments, a thickness value can be associated with every point along the medial axis 414. The thickness values can represent a radius or area around each of the points such that when a union of all the areas around the points along the medial axis 414 is done, the result is a 3D object corresponding to the model 402.

According to embodiments, the medial axis 414 is a structure that defines or describes the 3D object represented by the model 402. For example, the medial axis 414 can be conceptualized as points where the branches 416 converge into a central part of the model 402. That is, the medial axis 414 is not a center point of the model 402, but represents central parts of the local sub-areas of the model 402. As illustrated in FIGS. 4C and 4D, the branches 416 coming from the surface tend to go over middle parts of sub-areas of the model 402. As shown in FIG. 4D, main branches of branches 416 are essentially the local centroid in the middle of local parts or sub-areas of the model 402. FIG. 4D shows how there can be multiple portions of medial axis 414 for different sub-areas of the model 402. Each of these portions can have branches 416 extending all the way to the surface or boundary of the model 402. In one embodiment, anywhere there are relatively sharp angles between portions of the medial axis 414, a branch 416 is created in the branching structures shown in FIGS. 4C and 4D.

Figure 4E:
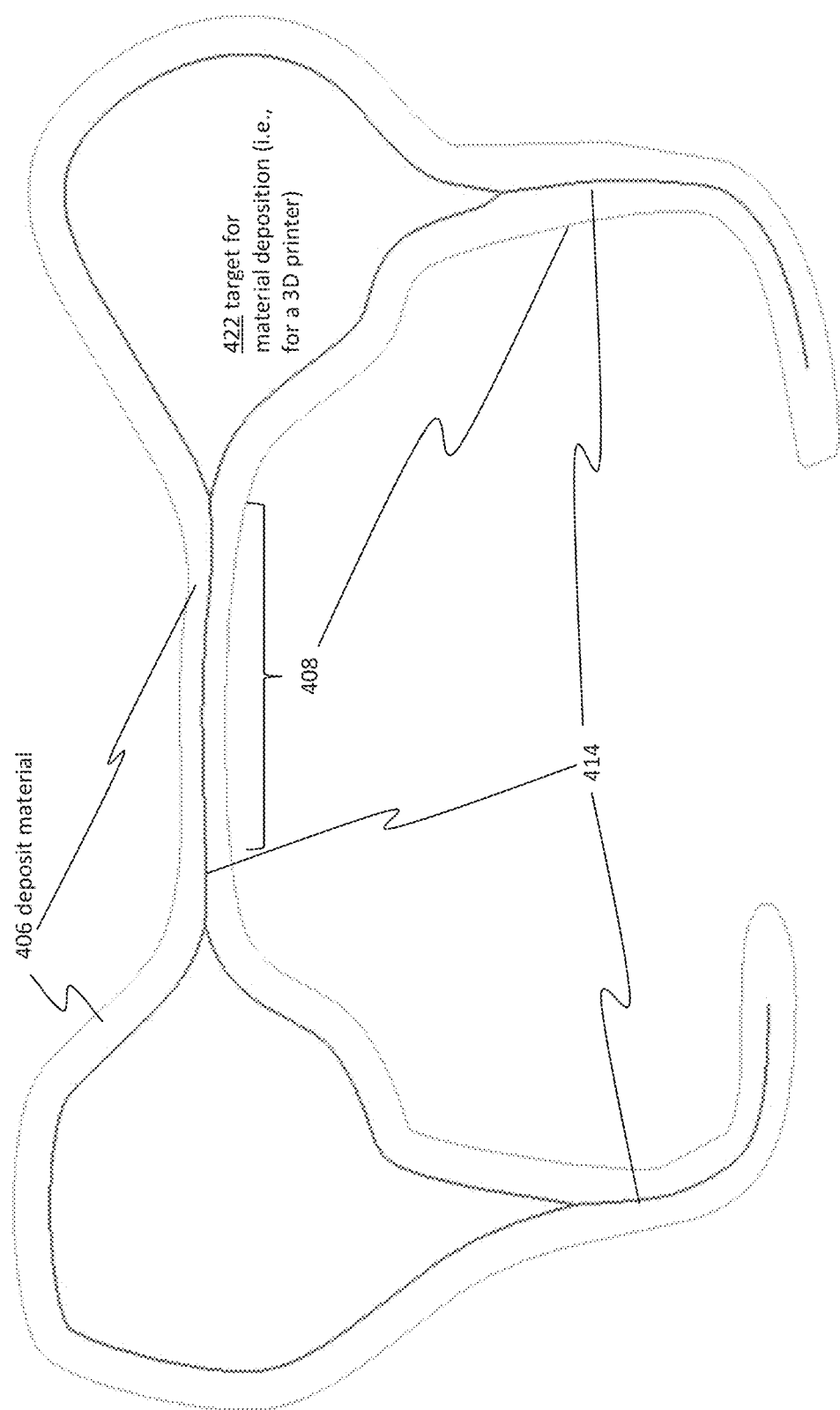

FIG. 4E shows how, after performing an extended grassfire burning transform on the model 402, the preserved thin components 408 are then added to the insetted shape 412 from FIG. 4B to produce a target 422 for material deposition. In the example of FIG. 4E, the target 422 for material deposition is a target object for a 3D printer to add a deposit material 406 onto. According to embodiments, one or more of an amount or depth of the deposit material 406 can be deposited onto the target 422 in order to create a 3D object corresponding to an output model that is based at least in part on the thin components 408 and the insetted shape 412. As described above with reference to steps 310-314 of the method 300, the union of the insetted shape 412 and the preserved thin components 408 can produce an output model usable by an output device, such as a 3D printer, to print a 3D object including the preserved thin components 408. As shown in FIG. 4E, the thin components 408 can be combined with the insetted shape 412 to create a final, target 422 shape for printer material deposition by a selected 3D printer. The selected 3D printer can deposit a layer of printing material, such as the deposit material 406 shown in FIG. 4E, on the target 422 to create a 3D object corresponding to the model 402. That is, FIG. 4E shows the union of the insetted shape 412 from FIG. 4B and the thin components 408. As illustrated in FIG. 4E, this union is the target 422 for the deposit material 406. As shown, after a layer of the deposit material 406 is disposed or deposited onto surfaces of the target 422 as part of a 3D printing process, the resulting 3D object includes the thin components 408. In an embodiment, the preserved thin components 408 in the output 3D object have substantially the same widths as in the model 402.

Exemplary Result of Thin Feature Preservation

Figure 5:
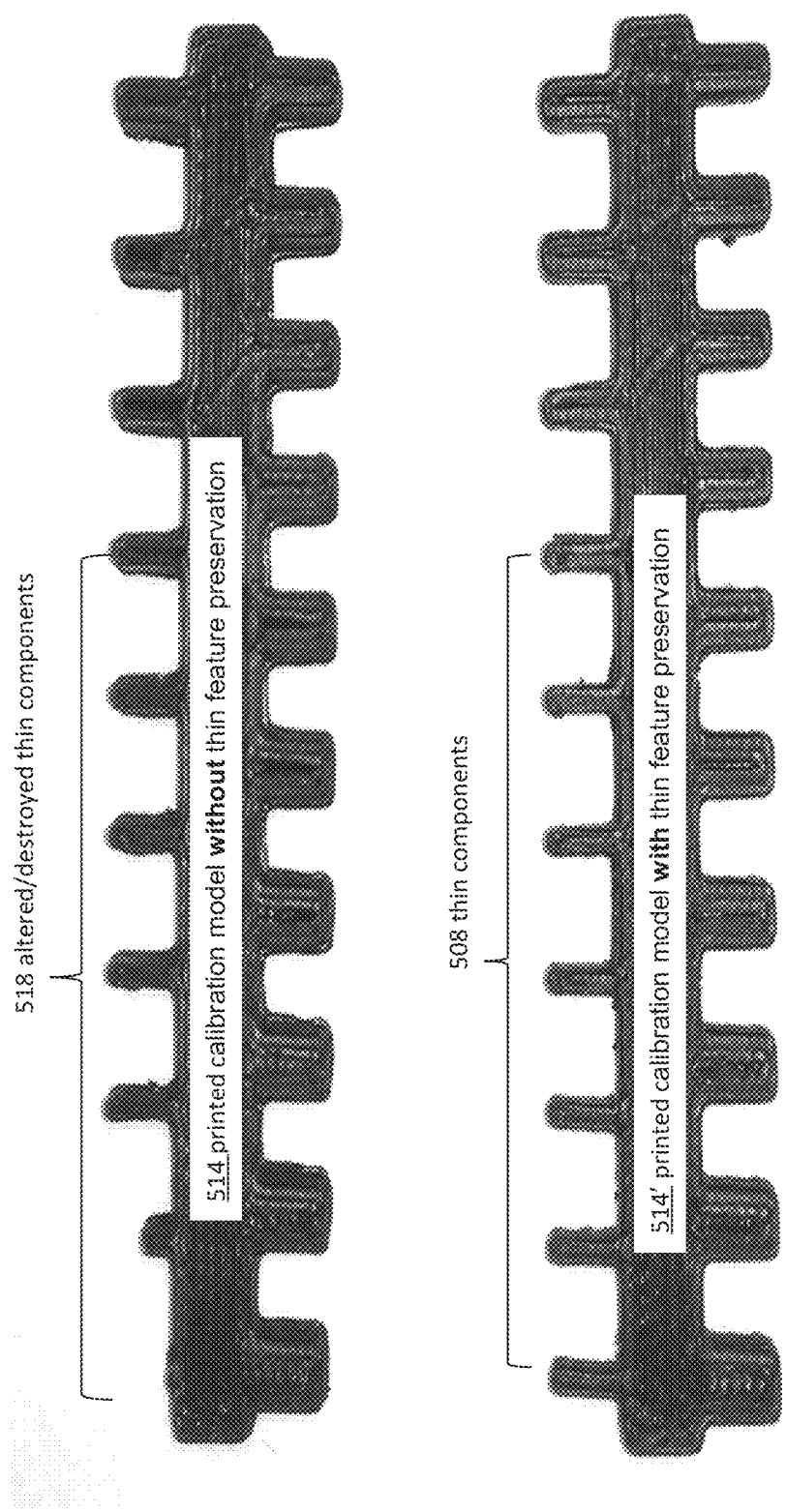
FIG. 5 illustrates an exemplary result of printing a 3D object corresponding to a 3D model, in accordance with embodiments.

FIG. 5 depicts an exemplary printed calibration model 514 without thin feature preservation (see, e.g., altered/destroyed thin components 518) and shows another printed calibration model 514' resulting from using the above-described thin feature preservation techniques (see, e.g., preserved thin components 508). As shown, when the thin components 508 are not preserved (i.e., due to thin feature preservation not being enabled), some of the teeth of the comb of the printed calibration model 514 are either not output correctly or disappear entirely (see, e.g., altered/destroyed thin components 518). In embodiments, performing the method 300 described above with reference to FIG. 3 results in the other printed calibration model 514' with thin components 508 preserved. In contrast, in cases where the thin feature preservation method 300 is not used, the resulting printed calibration model 514 does not include the preserved thin components 508 and instead includes altered and destroyed thin components 518.

Application of an Exemplary Grassfire Transform

Figure 6A:
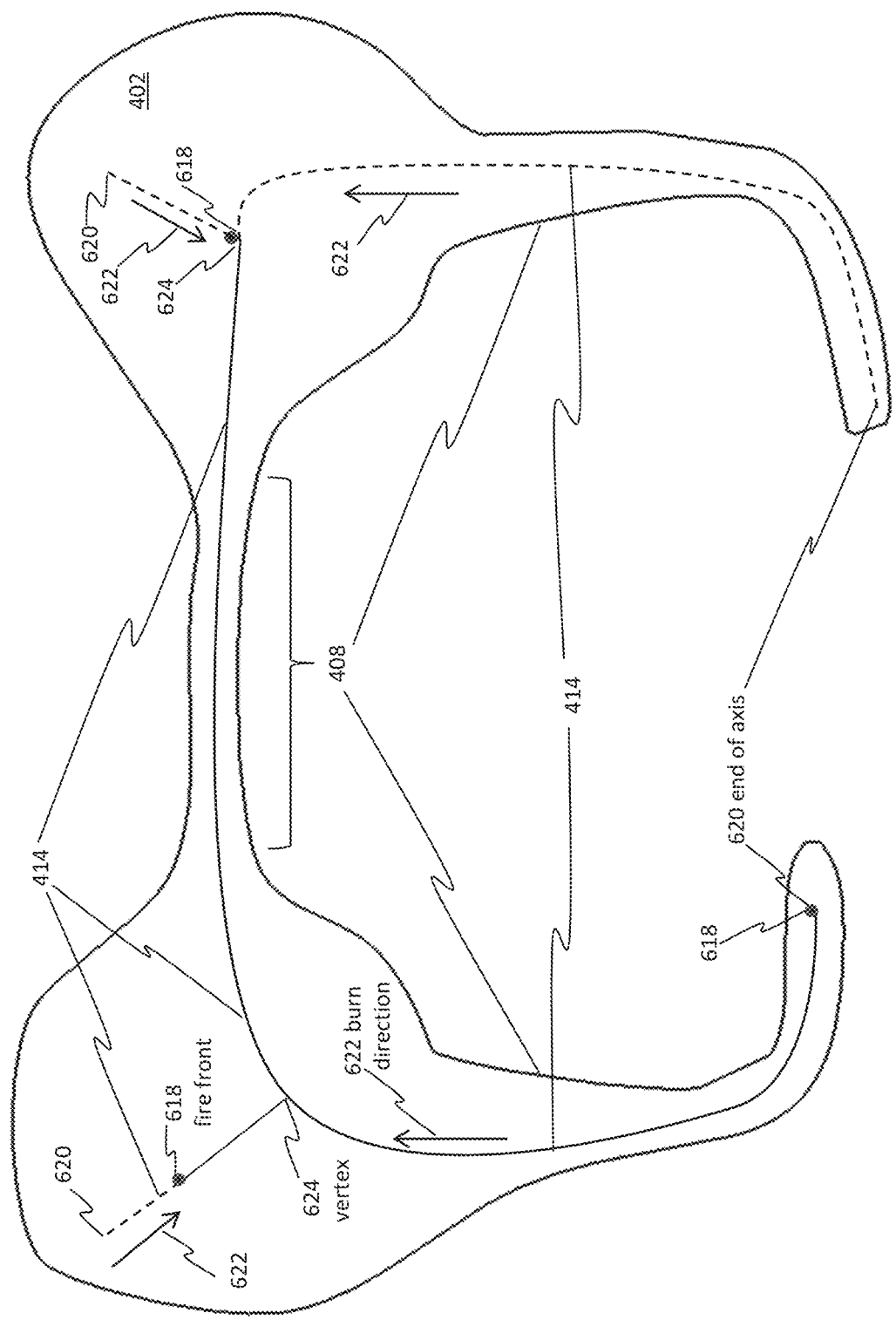
FIGS. 6A and 6B illustrate application of a grassfire transform on a shape, in accordance with embodiments.
Figure 6B:
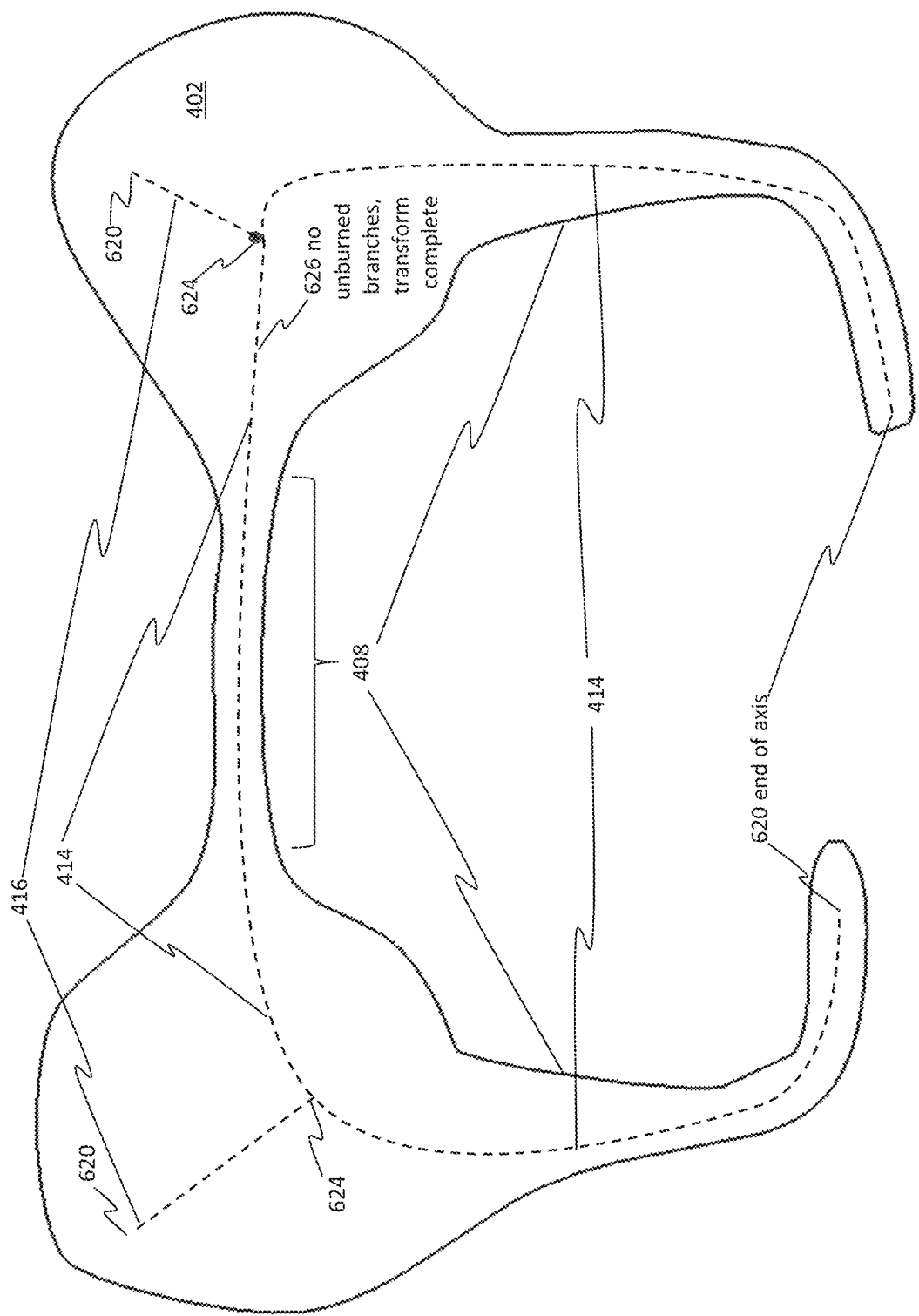

FIGS. 6A and 6B illustrate an exemplary application of a grassfire transform on a medial axis 414 of a shape 402. As shown, fire fronts 618 are ignited at ends 620 of the medial axis 414 and branches 416 and advance in burn directions 622. Fire fronts 618 meeting at the same point, such as vertex 624, are annihilated (i.e., put each other out). In cases where two or more fire fronts 618 meet at a location such as the vertex 624 and there are no more un-burned branches of the medial axis 614 at the location, those fire fronts 618 are quenched (i.e., are no longer active). As shown in FIG. 6B, application of the exemplary grassfire transform is complete when all fire fronts 618 are either annihilated or quenched.

Exemplary Medial Axis

Figure 7:
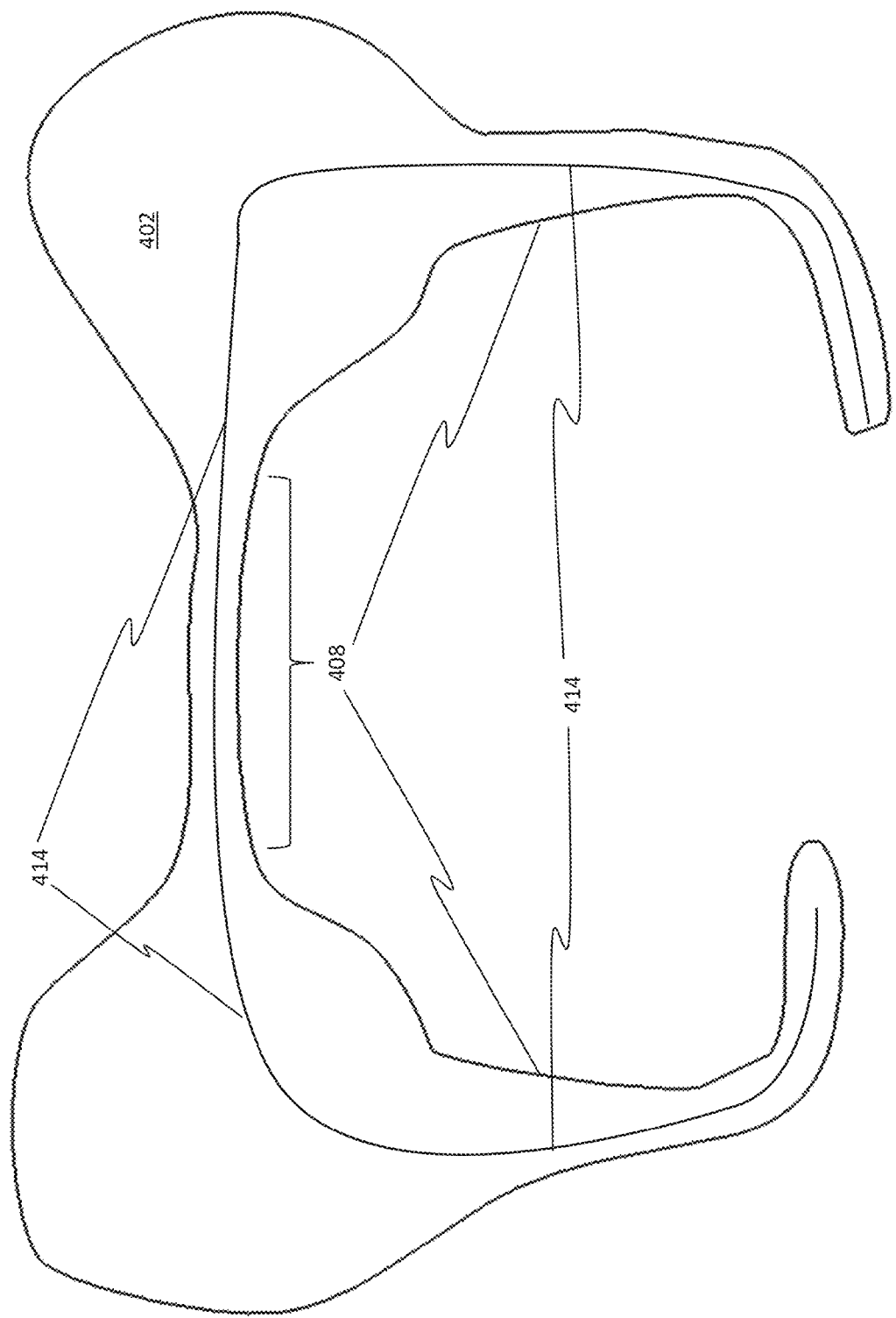
FIG. 7 depicts an exemplary medial axis for a 3D shape, in accordance with embodiments.

FIG. 7 depicts an exemplary medial axis of a shape. In particular, FIG. 7 shows medial axis 414 for a shape 402. The shape 402 can correspond to a 3D model or object. FIG. 7 illustrates how a medial axis 414 can be calculated for a 3D shape 402. FIG. 7 also shows the results of generating medial axis 414 of the 3D shape 402 and applying an extended grassfire transform to the medial axis 414 and its branches (see, e.g., branches 416 in FIGS. 4C, 4D, 6A and 6B).

As shown in FIG. 7, given a shape, e.g., shape 402, a medial axis 414 can be generated. For example, medial axis 414 is a curve or line representing a collection of interior points within shape 402 with at least two closest points on a boundary of shape 402. As shown in FIGS. 4C, 4D, 6A, 6B, generation of the medial axis 414 of FIG. 7 can be conceptualized as applying a grassfire to branches 416, where the shape 402 represents a field of grass with uniform density. To prune the branches 416 and generate the remaining medial axis 414, virtual 'fires' are ignited on the border of the shape 402 at the tips of the branches 416 (see, e.g., ends 620 of the axis in FIGS. 6A and 6B). These virtual fires can propagate inward at a substantially uniform speed. An embodiment generates the medial axis 414 for the shape 402 at points where the different fire fronts meet, with fire fronts being extinguished when they meet, as described above with reference to FIGS. 6A and 6B. In additional or alternative embodiments, the grassfire analogy associates each point in the shape 402 with a 'burning time', which is the distance to the boundary of the shape 402. The generation of the boundary distance function and the medial axis 414 can be referred to as a grassfire transform.

Exemplary Computer System Implementation

One or more computing devices can be used to implement the feature preservation techniques described herein. The computing devices can also host a client application used to receive, create, and modify 3D models. Such a client application can also be configured to receive an output model produced by the method 300 to output a 3D object, including preserved components, corresponding to the output model. For example, as described below with reference to FIG. 8, a computing device configured to run any suitable graphics application, such as, but not limited to, Adobe® Photo-Shop®, can be used to perform the printing of 3D objects with thin components and features preserved using the techniques described herein. As described below with reference to FIG. 8, such a computing device can include a processor 804. The processor 804 may include a microprocessor, an application-specific integrated circuit (ASIC), a state machine, or other suitable processing device. The processor 804 can include any number of computer processing devices, including one. The processor 804 can be communicatively coupled to a computer-readable medium, such as memories 808 and 810 shown in FIG. 8. The processor 804 can execute computer-executable program instructions and/or accesses information stored in the memories 808 and 810. The memories 808 and 810 can store instructions that, when executed by the processor 804, cause the processor 804 to perform operations described herein.

A computer-readable medium may include (but is not limited to) an electronic, optical, magnetic, or other storage device capable of providing a processor (see, e.g., the processor 804 of FIG. 8) with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

In some embodiments, one or more of the memories 808 and 810 can be implemented as firmware. As used herein, the term "firmware" is used to refer to one or more operating instructions for controlling one or more hardware components of a device. Firmware can include software embedded on a hardware device. A firmware module or program can communicate directly with a hardware component, such as the processor 804 of the computing device 800 shown in FIG. 8, without interacting with the hardware component via an operating system of the computing device.

Figure 8:
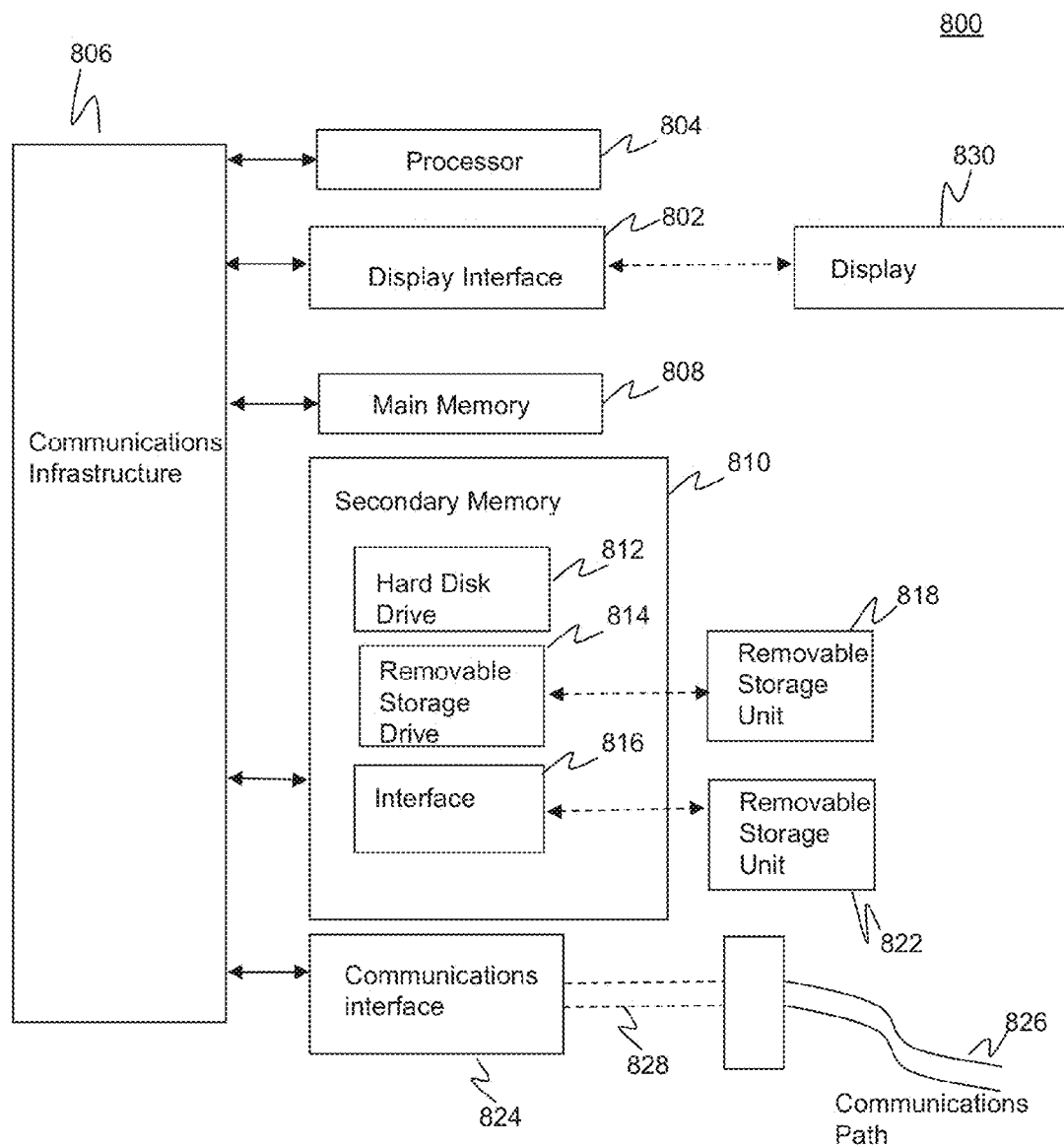
FIG. 8 is a diagram of an exemplary computer system in which embodiments of the present disclosure can be implemented.

Although exemplary embodiments have been described in terms of systems and methods, it is contemplated that certain functionality described herein may be implemented in software on microprocessors, such as the processor included in computing devices such as the computer system 800 illustrated in FIG. 8. In various embodiments, one or more of the functions of the various components may be implemented in software that controls a computing device, such as computer system 800, which is described below with reference to FIG. 8.

Aspects of the present invention shown in FIG. 3-7, or any part(s) or function(s) thereof, may be implemented using hardware, software modules, firmware, tangible computer readable media having logic or instructions stored thereon, or a combination thereof and may be implemented in one or more computer systems or other processing systems.

FIG. 8 illustrates an example computer system 800 in which embodiments of the present invention, or portions thereof, may be implemented as computer-readable instructions or code. For example, some functionality performed by a computing device executing an application implementing the method 300 shown in FIG. 3, can be implemented in the computer system 800 using hardware, software, firmware, non-transitory computer readable media having instructions stored thereon, or a combination thereof and may be implemented in one or more computer systems or other processing systems. Hardware, software, or any combination of such may embody certain modules and components used to implement steps in the method 300 illustrated by the flowchart of FIG. 3 discussed above.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 800. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device. As will be appreciated by persons skilled in the relevant art, processor device 804 may also be a single processor in a multi-core/multiprocessor system, such system operating alone, or in a cluster of computing devices operating in a cluster or server farm. Processor device 804 is connected to a communication infrastructure 806, for example, a bus, message queue, network, or multi-core message-passing scheme.

Computer system 800 also includes a main memory 808, for example, random access memory (RAM), and may also include a secondary memory 810. Secondary memory 810 may include, for example, a hard disk drive 812, removable storage drive 814. Removable storage drive 814 may comprise a floppy disk drive, a magnetic tape drive, an optical disk drive, a flash memory, or the like.

The removable storage drive 814 reads from and/or writes to a removable storage unit 818 in a well known manner. Removable storage unit 818 may comprise a floppy disk, magnetic tape, optical disk, etc. which is read by and written to by removable storage drive 814. As will be appreciated by persons skilled in the relevant art, removable storage unit 818 includes a non-transitory computer readable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or EEPROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Communications interface 824 may include a modem, a network interface (such as an Ethernet card), a communications port, a PCMCIA slot and card, or the like. Software and data transferred via communications interface 824 may be in the form of signals, which may be electronic, electromagnetic, optical, or other signals capable of being received by communications interface 824. These signals may be provided to communications interface 824 via a communications path 826. Communications path 826 carries signals and may be implemented using wire or cable, fiber optics, a phone line, a cellular phone link, an RF link or other communications channels.

As used herein the terms "computer readable medium" and "non-transitory computer readable medium" are used to generally refer to media such as memories, such as main memory 808 and secondary memory 810, which can be memory semiconductors (e.g., DRAMs, etc.). Computer readable medium and non-transitory computer readable medium can also refer to removable storage unit 818, removable storage unit 822, and a hard disk installed in hard disk drive 812. Signals carried over communications path 826 can also embody the logic described herein. These computer program products are means for providing software to computer system 800.

Computer programs (also called computer control logic) are stored in main memory 808 and/or secondary memory 810. Computer programs may also be received via communications interface 824. Such computer programs, when executed, enable computer system 800 to implement the present invention as discussed herein. In particular, the computer programs, when executed, enable processor device 804 to implement the processes of the present invention, such as the steps in the method 300 illustrated by the flowchart of FIG. 3, discussed above. Accordingly, such computer programs represent controllers of the computer system 800. Where the invention is implemented using software, the software may be stored in a computer program product and loaded into computer system 800 using removable storage drive 814, interface 820, and hard disk drive 812, or communications interface 824.

In an embodiment, a display device used to display a user interface for previewing the results shown in FIGS. 4-6 may be a computer display 830 shown in FIG. 8. The computer display 830 of computer system 800 can be implemented as a touch sensitive display (i.e., a touch screen). Similarly, user interfaces for a client application configured to receive, modify, and preview a 3D model may be embodied as a display interface 802 shown in FIG. 8.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

General Considerations

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing device memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing device from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the steps presented in the examples above can be varied—for example, steps can be re-ordered, combined, and/or broken into sub-steps. Certain steps or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method comprising:
receiving, by a computing device, a three dimensional (3D) model corresponding to a 3D shape;
receiving, by the computing device, selections of an output device and a printing material for printing a 3D object corresponding to the 3D shape;
determining, by the computing device, a feature size based at least in part on a possible feature size supported by the output device and properties of the printing material; insetting, by the computing device, an outline of the 3D shape inwards from a boundary of the 3D shape based on the feature size;
generating, by the computing device, a medial axis of the 3D shape;
applying, by the computing device, a mathematical transform to the medial axis to identify which parts of the medial axis correspond to one or more components of the 3D shape that need to be preserved, the one or more components including at least one of: (i) a component that is thinner than another component of the 3D shape or (ii) a surface feature of the 3D shape; and
producing, by the computing device, an output model by creating a union of the one or more components and the insetted shape corresponding to the 3D shape, wherein the output model that is produced includes the insetted shape and the one or more components, wherein the output device uses the output model to print the 3D object corresponding to the 3D shape.

2. The method of claim 1, wherein the transform is an extended grassfire transform applied to ends of the medial axis and branches from the medial axis to a boundary of the 3D shape.

3. The method of claim 1, wherein the applying comprises:
assigning a burn time to each vertex of the medial axis, the burn time indicating a distance to an end of a tube or a disk in the 3D shape that can be embedded on the medial axis at a given point; and
identifying the parts of the medial axis where the burn time is larger than a predefined threshold value as the parts of the medial axis corresponding to the one or more components that need to be preserved.

4. The method of claim 1, further comprising, prior to the generating, insetting the outline of the 3D shape inwards by a determined amount.

5. The method of claim 1, wherein
said insetting further comprises insetting the outline of the 3D shape inwards from the boundary of the 3D shape by half of the size.

6. The method of claim 1, wherein the applying comprises computing the parts of the medial axis corresponding to the one or more components that need to be preserved.

7. The method of claim 1, wherein at least one of the one or more components that need to be preserved has a width less than or equal to the feature size supported by the output device.

8. The method of claim 1, further comprising sending the output model to the output device capable of producing the 3D object corresponding to the output model.

9. A non-transitory computer readable storage medium having executable instructions stored thereon, that if executed by a processor of a computing device, cause the processor to perform operations, the instructions comprising:
  instructions for receiving a three dimensional (3D) model corresponding to a 3D shape;
  instructions for receiving selections of an output device and a printing material for printing a 3D object corresponding to the 3D shape;
  instructions for determining a feature size based at least in part on a possible feature size supported by the output device and properties of the printing material;
  instructions for insetting an outline of the 3D shape inwards from a boundary of the 3D shape based on the feature size;
  instructions for generating a medial axis of the 3D shape;
  instructions for applying a mathematical transform to the medial axis to identify which parts of the medial axis correspond to one or more components of the 3D shape that need to be preserved, the one or more components including at least one of: (i) a component that is thinner than another component of the 3D shape or (ii) a surface feature of the 3D shape; and
  instructions for producing an output model by creating a union of the one or more components and the insetted shape corresponding to the 3D shape, wherein the output model that is produced includes the insetted shape and the one or more components, wherein the output device uses the output model to print the 3D object corresponding to the 3D shape.

10. The non-transitory computer readable storage medium of claim 9, wherein the instructions for applying further comprise instructions for:
  assigning a burn time to each vertex of the medial axis, the burn time indicating a distance to an end of a disk in the 3D shape that can be embedded on the medial axis at a given point; and
  identifying portions of the medial axis where the burn time is larger than a predefined threshold value as portions of the medial axis corresponding to the one or more components that need to be preserved.

11. A system comprising:
  a computing device including a processor and a memory having instructions stored thereon, that, if executed by the processor, cause the processor to perform operations comprising:
    receiving a three dimensional (3D) model corresponding to a 3D shape;
    receiving selections of an output device and a printing material for printing a 3D object corresponding to the 3D shape;
    determining a feature size based at least in part on a possible feature size supported by the output device and properties of the printing material;
    insetting an outline of the 3D shape inwards from a boundary of the 3D shape based on the feature size;
    generating a medial axis of the 3D shape;
    applying a mathematical transform to the medial axis to identify which parts of the medial axis correspond to one or more components of the 3D shape that need to be preserved, the one or more components including at least one of: (i) a component that is thinner than another component of the 3D shape or (ii) a surface feature of the 3D shape; and
    producing an output model by creating a union of the one or more components and the insetted shape corresponding to the 3D shape, wherein the output model that is produced includes the insetted shape and the one or more components, wherein the output device uses the output model to print the 3D object corresponding to the 3D shape.

12. The system of claim 11, wherein the producing comprises:
  indicating a depth of printing material to be deposited onto an outer boundary of the output model to produce the 3D object corresponding to the 3D shape.

13. The system of claim 11, wherein the applying further comprises applying an extended grassfire transform.

14. The system of claim 11, wherein the applying comprises:
  marking portions the parts of the medial axis corresponding to the one or more components; and
  storing the 3D model corresponding to the 3D shape in the memory, the 3D model including the marked medial axis parts corresponding to the one or more components.

15. The system of claim 11, further comprising:
  forwarding the output model to the output device.

16. The system of claim 15, wherein the output device is a 3D printer, and wherein the producing comprises:
  indicating an amount of printing material to be deposited onto surfaces of the output model to produce the 3D object corresponding to the 3D shape.

* * * * *